US006202759B1

(12) United States Patent
Chen

(10) Patent No.: US 6,202,759 B1
(45) Date of Patent: Mar. 20, 2001

(54) SWITCH DEVICE FOR A POWER TOOL

(75) Inventor: Ting-Kuang Chen, Keelung (TW)

(73) Assignee: Power Network Industry Co., Ltd., Taipei (TW)

(*) Notice: Subject to any disclaimer, the term of this patent is extended or adjusted under 35 U.S.C. 154(b) by 0 days.

(21) Appl. No.: 09/602,699

(22) Filed: Jun. 24, 2000

(51) Int. Cl.[7] .............................. B23B 45/16; B25D 11/04

(52) U.S. Cl. ................................................ 173/48; 173/216

(58) Field of Search ................................ 173/48, 47, 216, 173/178; 408/124, 139, 20

(56) References Cited

U.S. PATENT DOCUMENTS 5,375,665 * 12/1994 Fanchang et al. ..................... 173/48
5,451,127 9/1995 Chung .
5,531,278 * 7/1996 Lin ....................................... 173/178
5,711,380 * 1/1998 Chen ...................................... 173/48
5,842,527 * 12/1998 Arakawa et al. ....................... 173/48
6,045,303 4/2000 Chung .
6,142,242 * 11/2000 Okumura et al. .................... 173/216

* cited by examiner

*Primary Examiner*—Scott A. Smith

(57) ABSTRACT

A switching device for a power tool is provided. It comprises a housing, a rotary collar, an output axle with stepped portion, fixing gear wheel and a movable gear wheel. By the rotation of the rotary collar, the output axle can be retracted into the housing by an axial force to make contact of the movable gear wheel with the fixing gear wheel. Therefore, the switch collar device can adjust the output axle to switch between an position for simple rotation only and a position for rotation with impact. The whole structure of the present invention is more simple and cheaper than that of the conventional tool because it uses less parts.

2 Claims, 4 Drawing Sheets

SWITCH DEVICE FOR A POWER TOOL

BACKGROUND OF THE INVENTION

1. Field of the invention

The present invention generally relates to a switching device for a power tool, and especially to a switching device with a simple rotary collar structure for adjusting the output axle of a power tool to be able to switch between a position for rotation and a position for rotation with impact.

2. Description of the Prior Art

A conventional power tool for driving a screwdriver or a drill can drive only by rotation. Sometimes, a body can not be drilled or a screw in the body can not be drawn out due to the sort of material it is made of or being overly fastened. Some manufacturers have developed output axles for power tools to be able to switch between a position for rotation and a position for rotation with impact in order to have the output axle simultaneously rotate and fast impact axially to hammer a drill into a body to be drilled or to screw out a screw having been overly fastened. In a Taiwan patent application No. 87,210,470, a rotary switching device having both rotation and impact functions is provided to make a power tool work in a more convenient and practical way. However, the rotary switching device includes more elements, the whole structure thereof is more complicated. This makes a higher cost of production.

SUMMARY OF THE INVENTION

The present invention makes improvement against the above stated defect of the stated prior art.

The primary object of the present invention is to provide a rotary switching collar device of simple structure. By the rotation of a rotary collar, up to 360°, the switching collar device can adjust the output axle of a power tool to switch between a position for simple rotation and a position for rotation with impact.

Accordingly, the present invention provides a switching device for a power tool. It is provided on an output axle with a fixing seat, a spring, a fixing ring, a switching member, a fixing gear wheel and a movable gear wheel. These members are assembled in a housing. The fixing gear wheel is fixed in the housing, while the movable gear wheel is movable along the output axle. The output axle is combined with a speed reducer provided in the housing. A rotary collar is provided outside the housing. The external periphery of the switching member is provided with a plurality of protruding blocks with different sizes. The protruding blocks can be matched with a plurality of axial slide grooves provided in the rotary collar. The switching member can be rotated along with the rotation of the rotary collar. The fixing ring is also provided between the fixing seat and the switching member and is provided centrally thereof with a through hole for extending therethrough of the output axle. The through hole is provided on the inner edge thereof with a plurality of notches with their sizes corresponding to those of the aforesaid protruding blocks.

By the rotation of the rotary collar, the output axle can be retracted into the housing by an axial force to make contact of the movable gear wheel with the fixing gear wheel, when the protruding blocks on the switching member are aligned with the corresponding notches in the fixing ring. In this way, an axial impact can be generated during the rotation of the output axle. When the axial force is relieved of, the output axle is restored to its original position by the spring. Furthmore, when the protruding blocks on the switching member is not aligned with the corresponding notches in the fixing ring, the output axle cannot be moved axially, and can only do simple rotation.

The present invention will be apparent in its objects and functions after reading the detailed description of the preferred embodiment thereof with reference to the accompanying drawings.

DETAILED DESCRIPTION OF THE PREFERRED EMBODIMENT

Figure 1:
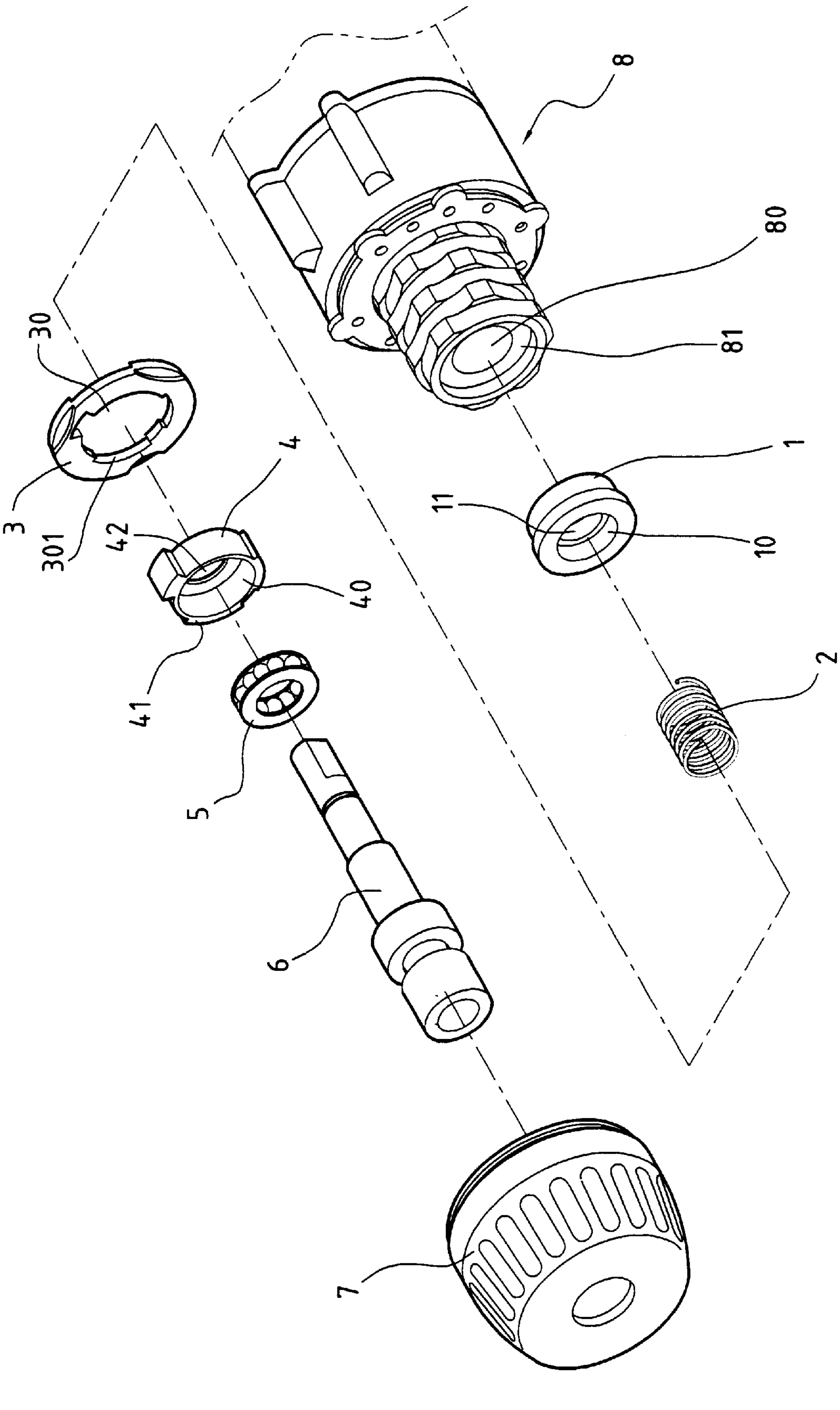
FIG. 1 an analytic perspective view showing the relationship of the combination of the structural elements of the switching device according to the present invention.
Figure 2:
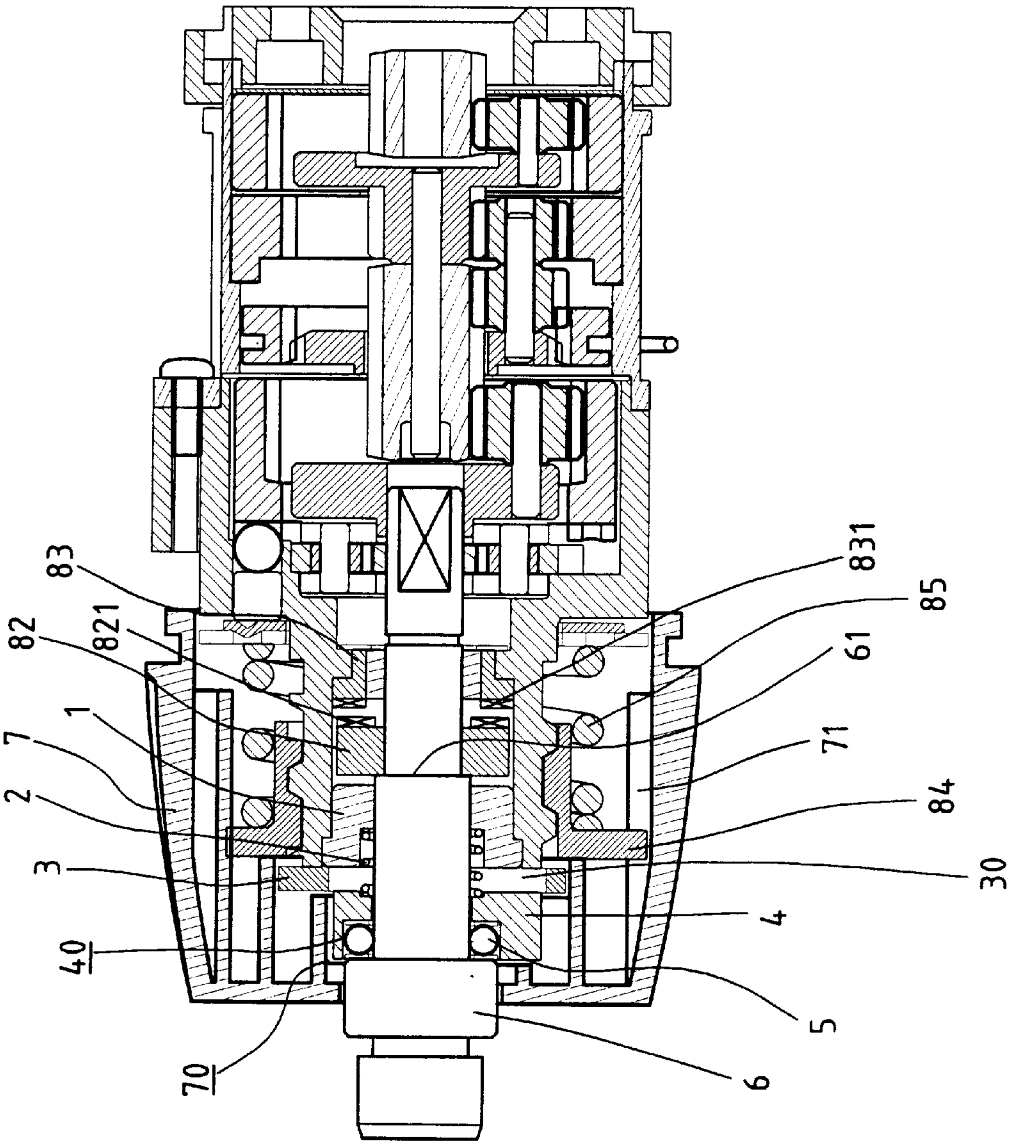
FIG. 2 is a cross-sectional view showing the mating of the structural elements of the switching device with a power tool, according to the present invention.

Referring to FIGS. 1 and 2, the switching device for a power tool of the present invention is comprised of a housing 8, a fixing seat 1, a spring 2, a fixing ring 3, a switching member 4, an output axle 6, a rotary collar 7, a movable gear wheel 82 and a fixing gear wheel 83. Wherein, the housing 8 is provided in the front thereof with an external screw thread for screwing connection with a rotary ring 84, a spring 85 is provided between the rotary ring 84 and the front root portion of the housing 8. The rotary ring 84 is provided on the external periphery thereof with a plurality of protrusions cooperating with a plurality of grooves 71 provided in the inner surface of the rotary collar 7. Thereby, the rotation of the rotary ring 84 is controllable during the rotation of the rotary collar 7, and the extent of compression of the spring 85 can thus be adjusted to set the torsion force of the output axle 6. The housing 8 is provided centrally thereof with a hole 80, and the central hole 80 is provided in the front thereof with a recess 81 with a larger diameter. The fixing gear wheel 83 is provided thereon with a plurality of peripheral teeth 831, the fixing gear wheel 83 is provided in the central hole 80 of the housing 8 and is unable to move (referring to FIG. 2). The movable gear wheel 82 is provided thereon with a plurality of peripheral teeth 821, and is also provided in the central hole 80 of the housing 8 but is movable. The teeth 821, 831 are arranged to face to each other. The fixing seat 1 is provided centrally thereof with a hole 11 and is provided in the front thereof with an enlarged hole 10. The fixing seat 1 is fixedly provided in the central hole 80 of the housing 8 and is unable to move, the aforesaid spring 2 is place in the enlarged hole 10.

The switching member 4 is provided centrally thereof with a hole 42, the external periphery of the switching member 4 is provided with a plurality of protruding blocks 41 with different sizes. The switching member 4 is provided on one side thereof with a bearing hole 41 for receiving a thrust bearing 5. The fixing ring 3 is provided centrally thereof with a through hole 30 for extending therethrough of the output axle 6, the through hole 30 is provided on the inner edge thereof with a plurality of notches 301 with their sizes corresponding to those of the aforesaid protruding blocks 41 of the switching member 4. When the protruding blocks 41 are aligned with the corresponding notches 301, the switching member 4 gets through the through hole 30 of the fixing ring 3. On the contrary, when not in alignment, the switching member 4 cannot get through the through hole 30.

The rotary collar 7 of the present invention is provided therein with a plurality of axial slide grooves 70 in matching with the aforesaid protruding blocks 41 of the switching member 4. When the rotary collar 7 is cooperated with the housing 8 to make the protruding blocks 41 cooperate with the axial slide grooves 70, the rotation of the rotary collar 7 brings the switching member 4 to rotate.

The output axle 6 of the present invention is provided at a suitable location thereon with a stepped portion 61. The output axle 6 is extended in sequence through the hole 42 of the switching member 4, the through hole 30 of the fixing ring 3, the spring 2, the hole 11 of the fixing seat 1, the axle holes of the movable gear wheel 82 and the fixing gear wheel 83 respectively, and then is combined with the speed reducer in the housing 8 and the stepped portion 61 is abutted on the movable gear wheel 82.

Figure 3:
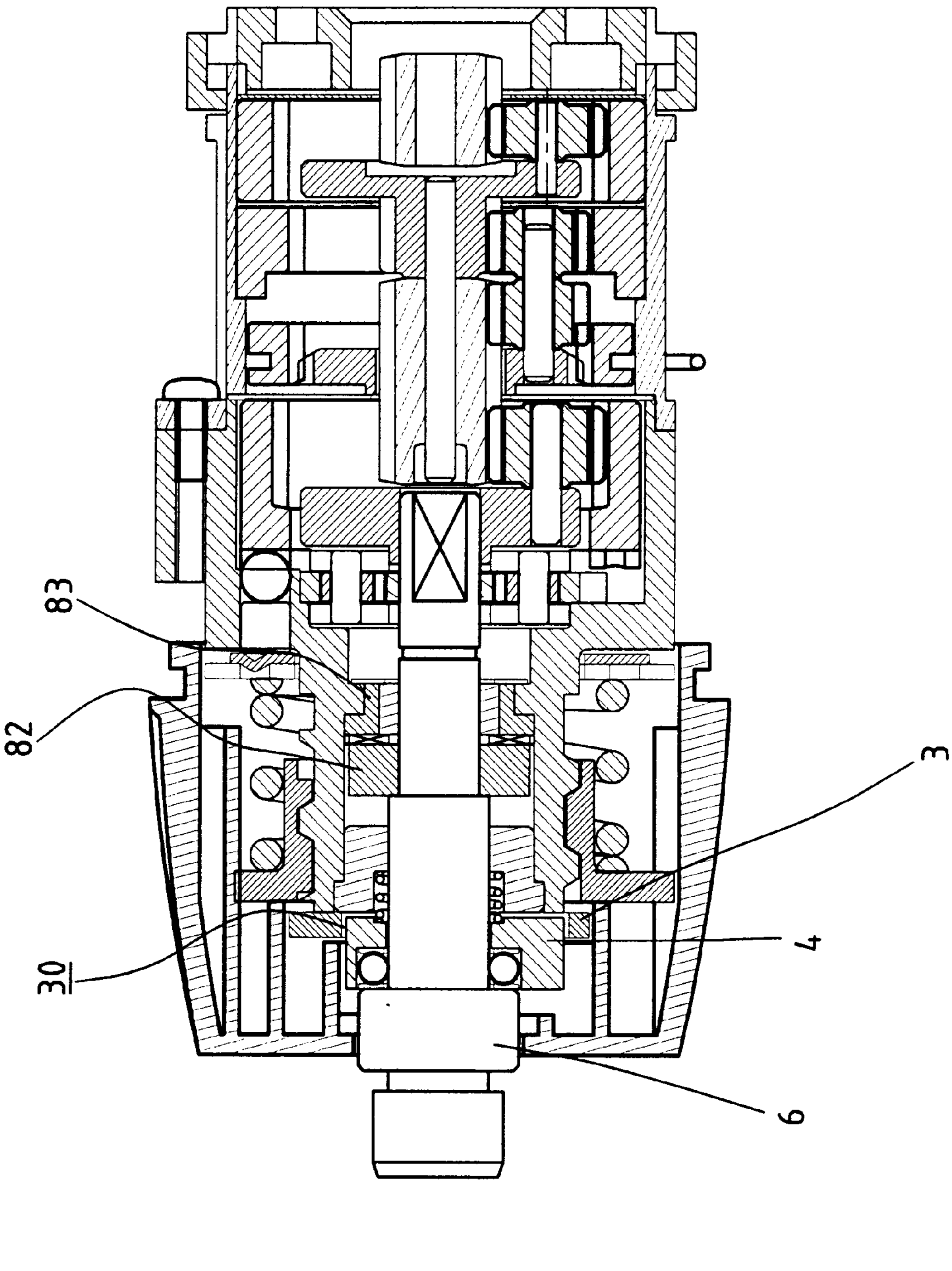
FIG. 3 is a schematic sectional view showing that the switching device and the fixing ring in FIG. 2 are not mated with each other. At this time, the output axle can be retracted into a power tool by an axial force to make contact of the movable gear wheel with the fixing gear wheel.
Figure 4:
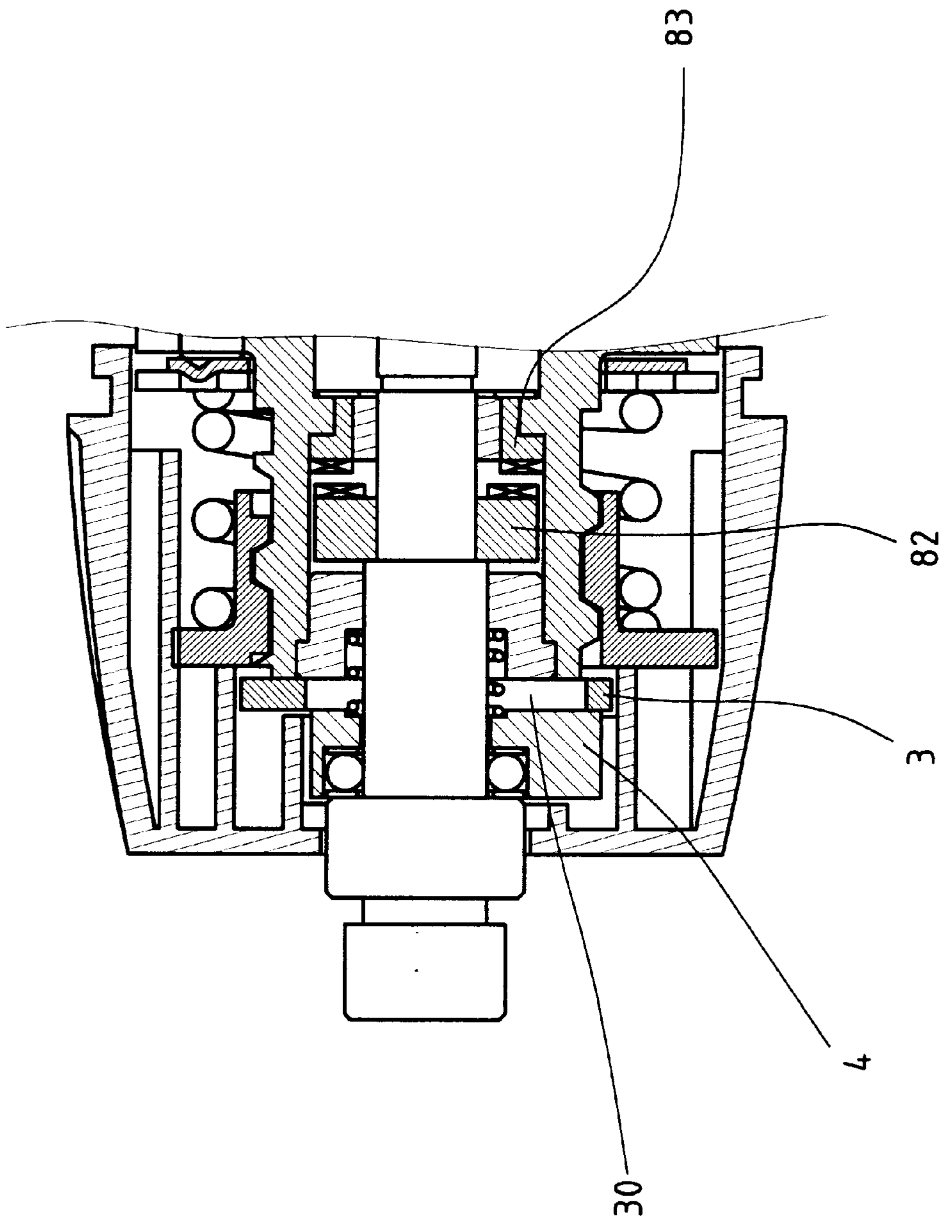
FIG. 4 is a schematic sectional view showing that the switching unit and the fixing ring according to the present invention are mated with each other. At this time, the output axle cannot be retracted into a power tool axially.

By providing the switching device of the present invention, when the rotary collar 7 is rotated to align the protruding blocks 41 of the switching member 4 with the corresponding notches 301 of the fixing ring 3, and when the tool bit on the end of the output axle 6 is pressed to exert force onto a work piece, the output axle 6 is retracted into the housing 8, thus the switching member 4 gets through the through hole 30 of the fixing ring 3 to press the spring 2, and in turn the peripheral teeth 821 and 831 of the movable gear wheel 82 and the fixing gear wheel 83 respectively contact with each other (referring to FIG. 3). Thereby, a impact effect is created when the output axle 6 is rotated. When the output axle 6 is stopped to act on the work piece, rebound of the spring 2 acts on the switching member 4 to reject the output axle 6 to its original position, and the peripheral teeth 821 of the movable gear wheel 82 can thus be separated from the peripheral teeth 831 of the fixing gear wheel 83. When it is desired that the output axle 6 simply rotates rather than impacts, only the rotary collar 7 is needed to rotate to disalign the protruding blocks 41 of the switching member 4 from the corresponding notches 301 of the fixing ring 3, thereby the switching member 4 cannot get through the through hole 30 of the fixing ring 3 (referring to FIG. 4). And the output axle 6 is unable to axially move the movable gear wheel 82 to make contact of the peripheral teeth 821 with the peripheral teeth 831 of the fixing gear wheel 83, and thereby only rotation is effected. Moreover, by virtue that sizes of the protruding blocks 41 of the switching member 4 are different from one another, and the shapes of the corresponding notches 301 of the fixing ring 3 are respectively corresponding to the protruding blocks 41, hence the rotary collar 7 must be rotated for 360 degrees in order to get the effect of providing axial impact.

The above statement is only for illustrating a preferred embodiment of the present invention, and not for giving any limitation to the scope of the present invention. It will be apparent to those skilled in this art that various modifications or changes can be made to the elements of the present invention without departing from the spirit, scope and characteristic of this invention. Accordingly, all such modifications and changes also fall within the scope of the appended claims and are intended to form part of this invention.

What is claimed is:

1. A Switching device for a power tool comprising:

a housing;

a rotary collar located outside said housing, said rotary collar having a plurality of axial slide grooves parallel to a central axis;

an output axle with stepped portion having a speed reducer in said housing;

a fixing gear wheel;

a movable gear wheel provided serially with said fixing gear wheel at said stepped portion of said output axle, said stepped portion abutting said movable gear wheel, and said fixing gear wheel having peripheral teeth in cooperation with peripheral teeth provided on said movable gear wheel, said output axle, said fixing gear wheel and said movable gear wheel being combined in said housing, said fixing gear wheel being immovably fixed in said housing, said movable gear wheel being adapted to moving along said output axle;

a fixing seat;

a spring;

a fixing ring; and a switching member, said fixing seat, said spring, said fixing ring and said switching member being serially provided on said output axle, said spring being mounted between said fixing seat and said switching member which is provided peripherally thereof with a plurality of protruding blocks with different sizes, said protruding blocks being matched with said axail slide grooves provided in said rotary collar, said switching member being rotated by rotation of said rotary collar, said fixing ring being provided also between said fixing seat and said switching member and being provided centrally thereof with a through hole for extending therethrough of said output axle, said through hole being provided on the inner edge thereof with a plurality of notches with their sizes corresponding to those of said protruding blocks, when said protruding blocks are aligned with said corresponding notches thereof, said switching member being allowed to get through said through hole of said fixing ring, on the contrary, when not in alignment, said switching member being not allowed to get through said through hoel.

2. The switching device for a power tool as claimed in claim 1, wherein said fixing seat is provided in the front thereof with an enlarged hole and said spring is place in said enlarged hole.

* * * * *